Oct. 7, 1958 R. R. COLBURN 2,855,060
TRACTOR AND SULKY ATTACHMENT THEREFOR
Filed Feb. 9, 1956 3 Sheets-Sheet 3

INVENTOR.
Richard R. Colburn
BY
ATTORNEY.

United States Patent Office 2,855,060
Patented Oct. 7, 1958

2,855,060

TRACTOR AND SULKY ATTACHMENT THEREFOR

Richard R. Colburn, Kansas City, Mo.

Application February 9, 1956, Serial No. 564,424

6 Claims. (Cl. 180—11)

This invention relates to the field of tractors and tractor-mower combinations.

As will be known by those generally familiar with the tractor and mower field, there have been known in the past and are presently on the market two-wheel power driven tractors susceptible of a wide variety of uses. In operating such tractors it is the conventional practice for the operator to walk along behind the unit, handle bars or the like being provided for purposes of steering. The motive power is supplied by an engine mounted on the tractor, and power take-off assemblies are provided for powering equipment which may be attached to the tractor such as mowers, plows, snow removal devices and circular saws.

Since many people find it either undesirable or impossible to engage in the physical exertion necessary to the operation of two-wheel tractors, some manufacturers provide sulky attachments which can be connected with the tractor and are drawn along behind the tractor as it progresses. Conventionally these sulkies are provided with a seat for the operator. The connection between the cart and tractor is usually made by means of a universal joint so that the direction of movement and the angle of the tractor relative the ground can still be controlled by sideways and up and down movement of the handle bars. One of the primary disadvantages of sulkies of this type, is the fact that the knees of the operator often interfere with free swinging of the handle bars. Also it is necessary to assume rather awkward positions in order to turn sharp corners or to avoid being struck by the handle bars when the tractor is moving over hilly and uneven ground.

One object of the present invention is to overcome the problems outlined above by providing a conversion attachment for tractors of the two-wheel type in which an improved rider's supporting frame is provided. Through the use of my invention the handle bars can be eliminated and the operator is thus relieved of the danger of being struck by the handles during operation of the unit. Notwithstanding the elimination of the handles, however, the manner of attachment of the tractor to the frame is such that in my invention full freedom of movement of the tractor about its own axle is still retained, thus permitting tilting of the tractor in either direction. This feature is particularly important in the use of the tractor as a power mower where the mower is mounted ahead of the tractor and in order to maintain a close cut must accommodate itself to irregularities in the terrain. Since the mowing assembly is generally made rigid with the tractor it follows that the tractor must be capable of tilting action in order to permit the rise and fall of the mower. This is fully provided for by my invention.

Another very important object of my invention is to provide a tractor conversion unit of the character described in which the normal tendency of the tractor to turn itself about its own axis upon engagement of the drive clutch is effectively resisted. As will be familiar to those having knowledge of two-wheel tractors operated alone or in conjunction with the sulky attachment for the rider, any resistance to forward motion of the tractor, whether inertia or otherwise, has the effect of exerting a reverse turning moment on the tractor itself. Often this moment is sufficiently strong to raise the nose of the tractor while at the same time bringing the handle bars down with a sharp and rapid movement dangerous to the safety of the operator. In my invention I have provided for means to resist this motion of the tractor. It is a feature of the invention that the resistance I have provided is yieldable and is so arranged in relation to the over-all assembly that when a mower is attached ahead of the tractor, the tractor still can tilt in either direction to accommodate the mower to changing ground contours.

Another object of the invention is to provide a conversion attachment of the character described in which yieldable stabilizing means are provided for continually urging the tractor into a predetermined stabilized neutral position relative the frame.

A further object of my invention is to provide a conversion attachment of the character described in which steering of the tractor is accomplished by means of steering mechanism connected with the wheels provided on the frame. In connection with this object it is a feature of the invention that the frame wheels are supported by a member rotatably connected with the frame about an axis generally parallel with the path of travel of the tractor and frame so that the frame wheels can assume an inclined position regardless of the position of the wheels of the tractor.

Still another object of the invention is the provision of lever means connected with the tractor or mower carrying member and the frame operable to tilt the tractor or carrying member upon the application of sufficient force thereto. In the preferred embodiment of the invention the lever system is dual and foot actuated, levers being provided with foot pedals positioned for convenient access from the driver's seat.

Other and further objects of the invention together with the features of novelty appurtenant thereto will appear in the course of the following description.

In the accompanying drawings which form a part of the specification and are to be read in conjunction therewith and in which like reference numerals indicate like parts in the various views;

Fig. 4 is an enlarged view taken along the line 4—4 of Fig. 2 in the direction of the arrows; and Fig. 5 is a sectional view taken along the line 5—5 of Fig. 4 in the direction of the arrows.

Figure 1:
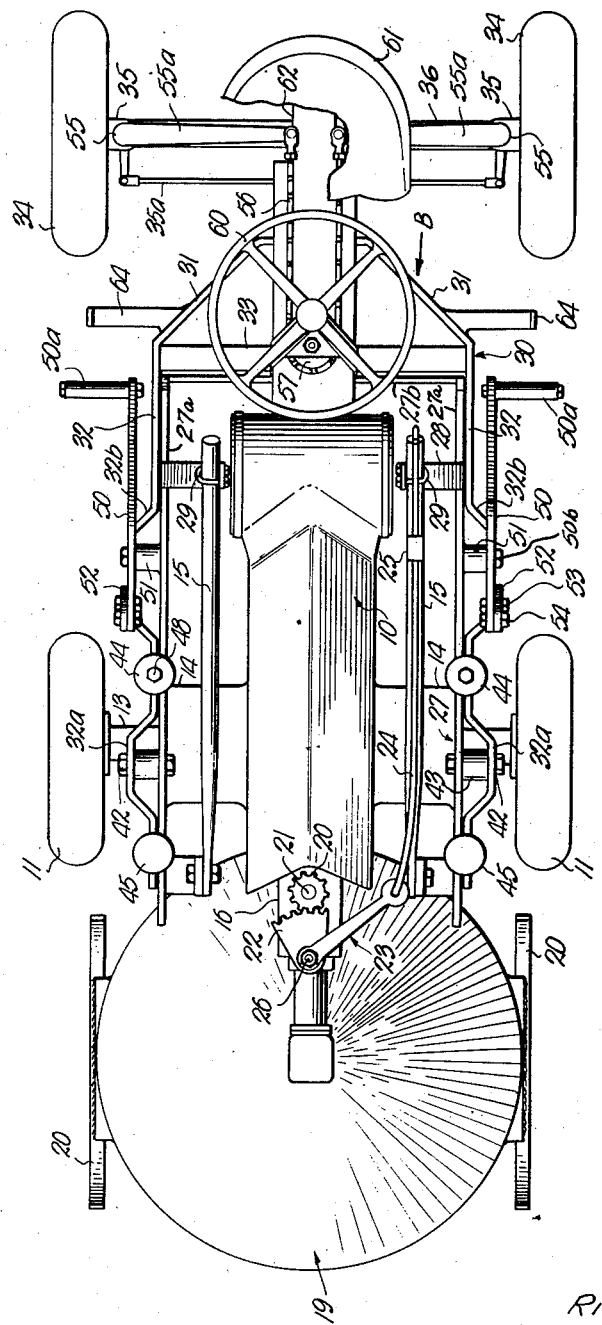
Fig. 1 is a top plan view of a preferred apparatus embodying the features of my invention.

Referring to the drawings, in order to illustrate my invention I have shown an assembly in which is embodied a two-wheel power driven tractor 10 of conventional design. An example of a specific tractor is the model L unit manufactured by Gravely Motor Plow and Cultivator Company, Dunbar, West Virginia, and disclosed and described in the 1952 Gravely Catalog at pages 22 and 23 thereof. Motive power is supplied to the wheels 11 of the tractor by an internal combustion engine 12, a suitable transmission (not shown) serving to drivingly connect the engine with the axle 13 of the tractor. It will be understood that the engine is mounted on a suitable chassis of which the axle housings 14 on opposite sides form a part. The conventional handle bars 15 are also illustrated, the upper portions or handles, however, having been eliminated since their presence is neither necessary nor desirable. The throttle and clutch controls for the tractor have not been shown inasmuch as they play no part in my invention. However, there is illustrated a power take-off enclosed in a housing 16 on the forward end of the tractor, the take-off being connected by suitable gearing with the drive shaft 17 of a spinner mower 18 shrouded by a circular housing 19. Skids 20 provide ground engaging support for the housing. The engagement and disengagement of the power take-off with engine 12 is controlled by a rotary gear 20 secured to the operating shaft 21 of the power take-off clutch. A sector gear 22 formed as one end of a bell crank 23 engages gear 20, the other end of the bell crank being connected with a push rod 24 slideably secured to one of the handle bars 15 by a bracket 25. The bell crank 23 is pivoted to the power take-off housing 16 at 26 and it will be evident that longitudinal movement of rod 24 is accompanied by rotation of gear 20.

To provide means for attaching the tractor to the frame 30 later to be described I have devised the side frame attaching plates 27 which are bolted by bolts 27c to the ends of the axle housings 14. The plates 27 are vertically disposed and extend forwardly and rearwardly a substantial distance from the tractor axle 13. The rearward ends of the attaching plates 27 are provided with enlarged sections 27a, the purpose of which will be later described. It will be noted, however, that secured to the tops of sections 27a are upwardly extending brackets 28 to which are clamped by means of U-bolts 29 the handle bars 15 on the opposite sides of the tractor. The rearmost ends of portions 27a are joined by a rigid cross brace 27b so that the plates 27 and cross brace form a generally U-shaped structure in which the plates are the legs of the U and the cross brace is the bight.

Disposed behind the tractor 10 is a bifurcated frame generally indicated by reference numeral 30. The frame is also generally U-shaped having its bight portion B formed by a pair of outwardly diverging diagonal members 31 to which are joined the spaced forwardly extending legs 32. As is believed evident from the drawings legs 32 lie on opposite sides of the tractor 10 and terminate well beyond the axle of the tractor. To strengthen the frame a cross piece 33 extends between the legs 32 at their juncture with the diagonal members 31.

To support the rearward portion of the frame there is preferably provided a pair of rear wheels 34 which are carried by stub axles affixed to conventional steering knuckles 35 connected together by a suitable parallelogram linkage including cross bar 35a. The steering knuckles are in turn carried at the opposite ends of a cross member 36. Rigidly secured to the top of the cross member and centrally located therein is a bearing sleeve 37. A shaft 38 is rotatably received in sleeve 37 and this shaft is secured rigidly to the merging diagonal frame portions 31, preferably by welding. A collar 39 secured to the shaft provides one thrust bearing between the shaft and the sleeve, the other being provided by a washer 40 which is engaged by a nut 41 threaded onto the end of the shaft.

The forwardly extending legs 32 of the frame are connected directly with the tractor or mower carrying member 10 through the medium of the frame attaching plates 27. Each leg 32 is pivotally connected with its adjacent plate by means of a pivot bolt or pin 42. The pins or bolts 42 are arranged on a common axis transverse to the normal path of travel of the tractor and parallel with the tractor axle 13. Preferably the axis of pins 42 is located above and slightly forward of the axle 12 so that the weight of the frame exerts a counter clockwise turning moment on the tractor chassis relative its axle.

As is best seen in Fig. 1, pins 42 are preferably received in sleeve bearings 43 which in turn are welded to the frame attaching plates 27. To accommodate the sleeve bearings legs 32 are outwardly bent as at 32a. However, on either side of the pin each leg 32 lies closely adjacent the attaching plate with the upper edges of the leg substantially level with the upper edge of the attaching plate.

Figure 2:
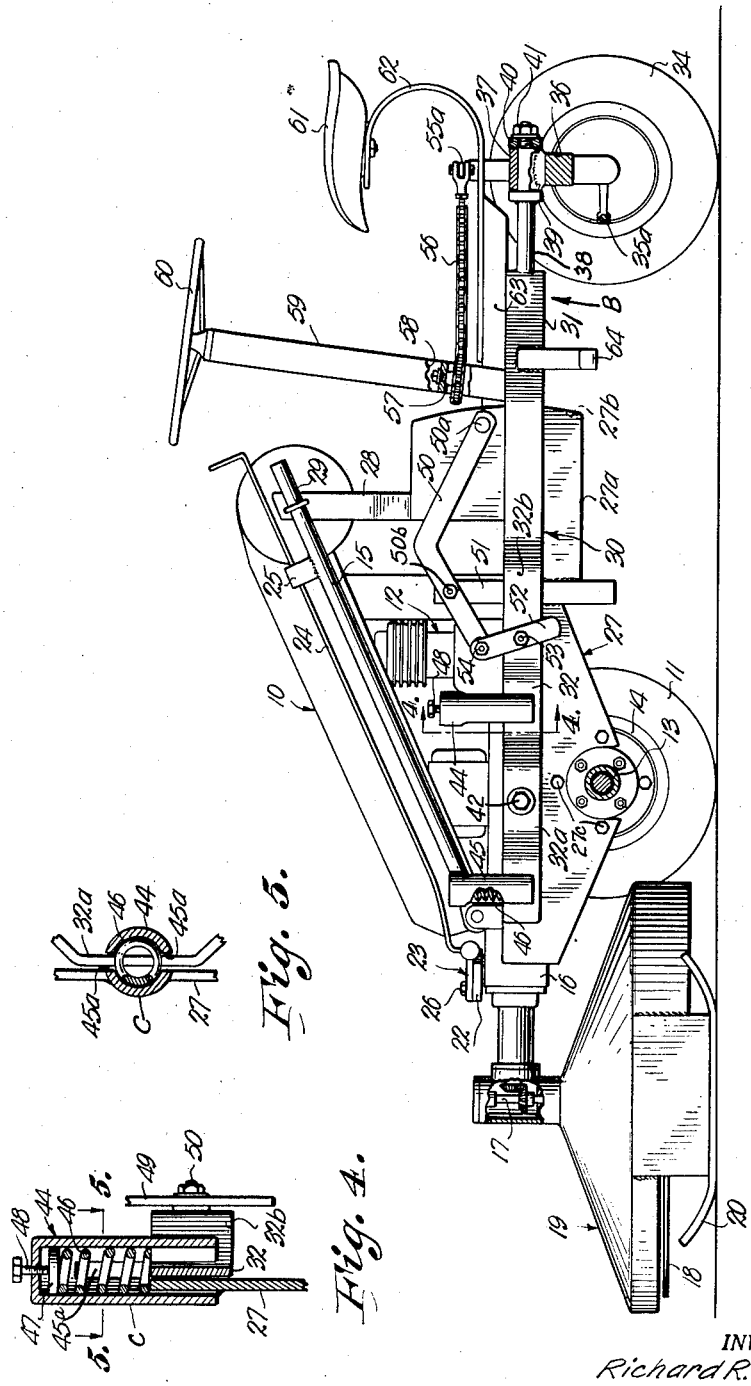
Fig. 2 is a side elevation of the apparatus shown in Fig. 1, the wheels on the near side having been removed and parts being broken away and parts shown in section for purposes of illustration.

Secured to the attaching plates 27 on each side of the tractor and located to the rear of pins 42 are a pair of identical spring cages 44. Similar cages 45 are spaced forwardly of pins 42 but for the present they will be ignored. The cages 44, as may be determined from Figs. 4 and 5, comprise in each case a hollow cylinder C provided with diametrically opposed longitudinal slots 45a wide enough in their lower portions to receive both the attaching plate 27 and the adjacent portion of leg 32. Each cylinder cage is rigidly secured to its attaching plate 27, preferably by welding. The upper portion of slot 45a extends above and is aligned with the top of the leg 32; and is slightly wider than the thickness of leg 32 so that the leg can move freely therein under circumstances later to be described. Disposed within each cage and substantially centered above leg 32 is a helical compression spring 46. The upper end of spring 46 bears against a movable plunger 47 carried by a shaft 48 threadedly connected with and extending through the top of the cage. It will be evident that any rotational movement of plates 27 relative legs 32 will be yieldably resisted by springs 46 and that there is thus provided a means of resisting turning of the tractor about its own axis in a counter-clockwise direction, as viewed in Figs. 2 and 3.

It should be understood that the strength of springs 46 is such that if the sole turning moment exerted is that which results from the inertia resistance to forward movement, then the plates 27 will be held substantially stationary relative the legs 32. However, the springs do not have enough strength to prevent this movement should a sufficiently strong upward force be exerted on the skids of the mower housing 19. In other words, even should the housing 19 rise as the tractor reaches an upward incline, the tractor wheels 11 will remain in contact with the ground (see Fig. 3). This means, of course, that the mower housing can freely follow the ground contours, the plates 27 turning about the wheel axis 14 relative legs 32 and causing compression of springs 46. Of course, springs 46 are aided in their anti-tractor tilting effect by the locating of the pins 42 ahead of the wheel axle 13. The degree of resistance of springs 46 can be adjusted by means of shaft 48, the turning of which displaces plunger 47 within the cage to increase or decrease effective length of the spring.

Figure 3:
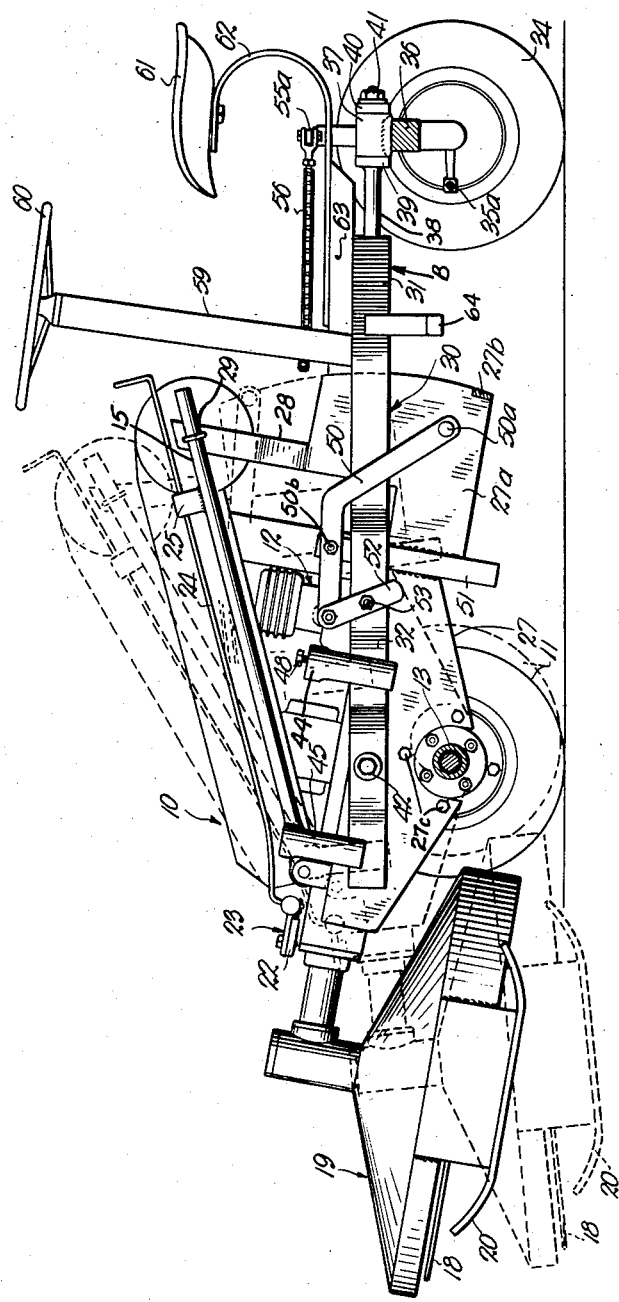
Fig. 3 is a side elevation similar to Fig. 2 but showing the tractor or mower carrying member tilted in various positions, the upper position being shown in solid lines and the lower in broken lines.

The front cages 45 are identical in construction with the rear cages 44 with the exception that they do not necessarily include the adjusting plunger 47. Each is connected with plates 27 in the identical manner described in connection with cages 44. Compression springs are contained in these cages to yieldably resist counter-clockwise turning (or dipping of the nose) of the tractor. The purpose of the front cages 45 and their contained springs is to cooperate with the rear springs 47 to provide means for stabilizing the tractor in a neutral position when the mower 18 and its housing 19 are removed. However, when the mower and housing are attached to the tractor, the large moment afforded by the forward location thereof more than counteracts the stabilizing effect of the springs and cages with the result that if the ground support for the mower is removed the tractor will tilt down at the nose as illustrated in Fig. 3.

One of the important features of my invention lies in the provision of manual means for raising at any desired time the forward portion of the tractor 10 and any attachments thereon, such as the mower 18 and housing 19. In the preferred embodiment there is shown for this purpose a pair of foot levers 50 disposed on opposite sides of the assembly. Each lever 50 is pivotally secured as at 50b intermediate its ends to an upstanding arm 51 welded or otherwise rigidly secured to the outside of the adjacent attaching plate 27. The frame legs 32 are bent outwardly as at 32b to pass around arms 51. The forward ends of levers 50 are pivotally secured to their respective legs 32 by links 52, the links 52 being pinned to the legs by bolts 53. It will be noted that the connection of the levers 50 with links 52 is pivotal, pins or bolts 54 providing the pivotal connection. Each lever 50 is equipped with a footrest 50a so that the levers can be depressed as a unit by the two feet of the operator. Depression of the levers exerts a downward force on arms 51 and causes the attaching plates 27 and tractor 10 to turn clockwise to the position illustrated in solid lines in Fig. 3. This in turn raises the mower 18 and its housing 19 free of the ground since they are rigidly affixed to the tractor. To return the mower to its ground engaging position, or to return the tractor to its neutral position, it is only necessary to relieve the pressure on levers 50.

As is believed evident from the drawings, steering of the unit is controlled at the rear wheels 34. Each steering knuckle 35 is provided with a turning lever 55 having a horizontal inwardly projection portion 55a. A chain 56 is connected at its ends with the ends of the lever portions 55a, the chain passing around a sprocket 57 secured to a steering shaft 58. The shaft is enclosed and supported in a suitable upright housing 59 and secured to the top of the steering shaft is a conventional steering wheel 60. The operator rides on a spring supported seat 61, the spring 62 being of the leaf-type and securely affixed to the frame 30 by a mounting bracket 63. To aid in reaching the seat, foot stirrups 64 are secured to the frame.

The operation of the invention will be described in connection with the use of the tractor for mowing. As the unit advances the mower skids 20 will follow the contour of the terrain due to the pivotal connection at pins 42 between the tractor and frame. For example, when the unit reaches an upward incline the mower housing will rise, tilting the tractor 10 in a clockwise direction. This is illustrated in the solid lines in Fig. 3. By the same token when the unit approaches a hollow the nose of the tractor will fall as the skids enter the hollow, the tractor again pivoting relative the frame about pins 42. Thus the mower blade 18 is continuously maintained in cutting proximity to the ground even though the terrain is rough and uneven. The continuous tilting of the tractor to accommodate the mower to the uneven topography is accomplished without any danger, however, to the operator since his knees are located well to the rear of the rearmost points on the tractor. Likewise the steering control remains in a fixed position relative the operator since it is secured to the frame on which he rides and not to the tractor chassis.

The operation of the rearward cages 44 and springs 46 in resisting "rearing" of the tractor 10 when it is set in motion from an at-rest condition has been described earlier herein. By providing such an arrangement "skipping" of the mower over patches of grass is prevented as well as danger to the operator. Further, these springs aid in maintaining the mower skids 20 in firm contact with the ground thereby preserving an evenness of cut.

Should it at any time be desired to raise the mower 18 and housing 19 to permit the passage of the mower over rocks, stumps or other obstructions, the operator need only depress levers 50 by pushing downward on the footrests 50a as hereinbefore described. When the pressure is released the weight of the mower plus the combined effects of the rear stabilizing means 44 will serve to cause the tractor to reassume the position in which skids 20 again ride on the ground. It will be evident that this feature can be usefully employed in connection with other attachments to the tractor such as snow removal mechanisms.

During the tilting action of the tractor 10 any twisting stresses which might otherwise be imposed on pivot pins 42 are prevented by the sliding engagement of the frame legs 32 with the enlarged rearward portions 27a of the attaching plate 27. It will be noted that portions 27a are of sufficient vertical depth to maintain a continuous sliding engagement with the legs even at the extreme tilted positions of the tractor.

From the foregoing it will be seen that this invention is one well adapted to obtain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. A riding conversion attachment for tractors of the two-wheel type in which the wheels are axle driven from the power unit on the tractor comprising a bifurcated frame disposed to the rear of said tractor and having the frame legs extending forwardly along the sides of the tractor on opposite sides thereof, a rider's seat mounted on and carried by the frame, means connecting said legs respectively with the opposite sides of the tractor, the legs being pivotally connected with the tractor on a common axis parallel with the axle of the tractor, ground engaging means supporting said frame rearwardly of said tractor, hand steering mechanism mounted on said frame and associated with said ground engaging means operable to control the direction of travel of the tractor, and lever means connected respectively with said tractor and said frame and operable to tilt said tractor relative said frame upon the application of force to said lever, said lever means so positioned as to be operable by the feet of an individual riding on the frame.

2. A riding conversion attachment for tractors of the two-wheel type in which the wheels are axle driven from the power unit on the tractor comprising a bifurcated frame disposed to the rear of said tractor and having the frame legs extending forwardly along the sides of the tractor on opposite sides thereof, a rider's seat mounted on and carried by said frame, means connecting said legs respectively with the opposite sides of the tractor, the legs being pivotally connected with the tractor on a common axis parallel with the axle of the tractor, resilient stabilizing means connecting said tractor and frame and yieldably resisting movement of said tractor relative said frame and about said axis in either direction from a neutral position, ground engaging means supporting said frame rearwardly of said tractor, steering mechanism associated with said wheel operable to control the direction of travel of the tractor, and lever means connected respectively with said tractor and said frame and operable to tilt said tractor relative said frame upon the application of force to said lever.

3. A riding conversion attachment for tractors of the two-wheel type in which the wheels are axle driven from the power unit on the tractor comprising a bifurcated frame disposed to the rear of said tractor and having the frame legs extending forwardly along the sides of the tractor on opposite sides thereof, a rider's seat mounted on and carried by the frame means connecting said legs respectively with the opposite sides of the tractor, the legs being pivotally connected with the tractor on a common axis parallel with the axle of the tractor and located forwardly of the axle of the tractor, resilient stabilizing means connecting said tractor and frame and yieldably resisting movement of said tractor relative said frame about said axis in either direction from a neutral position, and lever means connected respectively with said tractor and said frame and operable to tilt said tractor relative said frame upon the application of force to said lever, said lever means so positioned as to be operated by the feet of an individual riding on the frame.

4. A riding conversion attachment for tractors of the two-wheel type in which the wheels are axle driven from the power unit on the tractor comprising a pair of frame attaching plates secured to the opposite sides of the tractor, said plates being disposed in a substantially vertical and parallel disposition, a bifurcated frame disposed to the rear of said tractor and having the frame legs extending forwardly along the opposite sides of the tractor and said frame attaching plates, wheel means supporting the rearward portion of said frame, a rider's seat mounted on and carried by said frame, pivot pins pivotally connecting the respective frame legs with their adjacent attaching plates on a common axis substantially parallel with the axle of the tractor whereby said tractor can tilt relative said frame in either direction about said axis, portions of the upper edges of said plates and legs being at a common level forwardly of said pins and closely adjacent one another, resilient spring means having lower ends superposed on and bridging said edges, and retainer means secured to said legs and engaging the upper ends of said spring means thereby to cause said spring means to yieldably resist movement of the plate edge portions upwardly in relation to the leg edge portions.

5. A riding conversion attachment as in claim 4 wherein second portions of said edges are at a common level and closely adjacent one another rearwardly of said pins, and including second resilient means engaged by said edges and operable to yieldably resist the movement of the second edge portions of the plates upwardly relative said second edge portions of said legs.

6. A riding conversion attachment for tractors of the two-wheel type in which the wheels are axle driven from the power unit on the tractor comprising a pair of frame attaching plates secured to the opposite sides of the tractor, said plates being disposed in a substantially vertical and parallel disposition, a bifurcated frame disposed to the rear of said tractor and having the frame legs extending forwardly along the opposite sides of the tractor and said frame attaching plates, wheel means supporting the rearward portion of said frame, a rider's seat mounted on and carried by said frame, pivot pins pivotally connecting the respective frame legs with their adjacent attaching plates on a common axis substantially parallel with the axle of the tractor whereby said tractor can tilt relative said frame in either direction about said axis, upstanding posts secured to said plates rearwardly of said pivot pins, a pair of foot levers, one on each post, said foot levers being pivoted intermediate their ends to the respective posts on an axis substantially parallel with said common axis, links interconnecting the forward ends of said levers with the respective frame legs, and foot receiving means on the other ends of said levers whereby to permit pivoting of said levers by the feet of an operator thereby to pivot said tractor relative the frame about said common axis.

References Cited in the file of this patent
UNITED STATES PATENTS

| | | |
|---|---|---|
| 821,980 | Bloom | May 29, 1906 |
| 1,379,759 | Gerdeman | May 31, 1921 |
| 1,530,223 | Young | Mar. 17, 1925 |
| 2,218,064 | Amsbury | Oct. 15, 1940 |
| 2,530,041 | Bennett | Nov. 14, 1950 |
| 2,660,447 | Bear | Nov. 24, 1953 |
| 2,676,032 | Stegman | Apr. 20, 1954 |
| 2,678,462 | Lison et al. | May 18, 1954 |

FOREIGN PATENTS

| | | |
|---|---|---|
| 461,710 | Italy | Feb. 9, 1951 |